United States Patent
Ito

(10) Patent No.: US 8,945,760 B2
(45) Date of Patent: Feb. 3, 2015

(54) STORAGE ELEMENT AND TERMINAL FABRICATING METHOD

(75) Inventor: Syun Ito, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 0 days.

(21) Appl. No.: 13/316,226

(22) Filed: Dec. 9, 2011

(65) Prior Publication Data

US 2012/0148908 A1 Jun. 14, 2012

(30) Foreign Application Priority Data

Dec. 10, 2010 (JP) .................................. 2010-276298
Nov. 1, 2011 (JP) .................................. 2011-240127

(51) Int. Cl.
*H01M 2/30* (2006.01)

(52) U.S. Cl.
CPC ....................................... *H01M 2/30* (2013.01)
USPC .......................................... 429/179; 429/178

(58) Field of Classification Search
USPC ................................................ 429/178, 179
See application file for complete search history.

(56) References Cited

U.S. PATENT DOCUMENTS

| 6,013,389 | A | 1/2000 | Nakamaru et al. |
| 6,579,640 | B1 | 6/2003 | Nagase et al. |
| 2003/0104276 | A1 | 6/2003 | Mizuno et al. |
| 2003/0143460 | A1 | 7/2003 | Yoshida et al. |
| 2008/0038627 | A1 | 2/2008 | Yamauchi et al. |
| 2009/0136841 | A1 | 5/2009 | Watanabe et al. |
| 2010/0143786 | A1* | 6/2010 | Kim ................................ 429/158 |
| 2010/0173194 | A1* | 7/2010 | Fujiya et al. ................... 429/178 |
| 2010/0216008 | A1* | 8/2010 | Yoon .............................. 429/158 |
| 2010/0233526 | A1 | 9/2010 | Tasai et al. |
| 2012/0148908 | A1 | 6/2012 | Ito |
| 2012/0148909 | A1* | 6/2012 | Ito et al. ........................ 429/179 |

FOREIGN PATENT DOCUMENTS

| JP | 8-293301 A | 11/1996 |
| JP | 2001-93485 A | 4/2001 |
| JP | 2001-93486 A | 4/2001 |
| JP | 2003-173767 A | 6/2003 |
| JP | 2007-118047 A | 5/2007 |
| JP | 2008-66254 A | 3/2008 |
| JP | 2010-33766 A | 2/2010 |

OTHER PUBLICATIONS

Office Action dated Jan. 29, 2014 in U.S. Appl. No. 13/523,743.
(Continued)

*Primary Examiner* — Mark F Huff
*Assistant Examiner* — Olatunji Godo
(74) *Attorney, Agent, or Firm* — McGinn IP Law Group, PLLC

(57) ABSTRACT

A storage element includes: an external terminal having an exposed surface which is exposed to the outside from an envelope, a current collector which is contained inside of the envelope and is connected to the external terminal, and a power generating element which is contained inside of the envelope and is connected to the current collector. The external terminal includes: a flat portion exposed to the outside; and a shaft projecting from the flat portion to the inside of the envelope and being connected to the current collector.

18 Claims, 8 Drawing Sheets

(56) References Cited

OTHER PUBLICATIONS

United States Office Action dated Jun. 24, 2013, in U.S. Appl. No. 13/523,743.

Japanese Office Action dated May 7, 2014.
United States Office Action dated Mar. 21, 2014 in U.S. Appl. No. 13/316,234.
United States Office Action dated Mar. 21, 2014 in U.S. Appl. No. 13/316,266.

* cited by examiner

STORAGE ELEMENT AND TERMINAL FABRICATING METHOD

BACKGROUND OF THE INVENTION

1. Field of the Invention

The present invention relates to a storage element and a terminal fabricating method.

2. Description of the Related Art

There has been conventionally disclosed an external terminal in a battery as example of a storage element, in which four arms are enlarged under pressure in such a manner as to form a cross shape so that a non-deformed positive penetration connector is caulked to a positive fixed portion, thus achieving a positive superposition portion (see, for example, Japanese Unexamined Patent Application Laid-open No. 2010-33766).

However, in the above-described configuration, the non-deformed positive penetration connector is merely caulked to the positive fixed portion. A bus bar is connected to the external terminal via a positive tightening portion extending from the positive fixed portion.

SUMMARY OF THE INVENTION

An object of the present invention is to provide a storage element and a terminal fabricating method which can be readily fabricated at a reduced cost by simplifying the structure of an external terminal.

According to a first aspect of the invention, a storage element according to the present invention includes: an external terminal having an exposed surface which is exposed to the outside from an envelope, a current collector which is contained inside of the envelope and is connected to the external terminal, and a power generating element which is contained inside of the envelope and is connected to the current collector, wherein the external terminal includes: a flat portion exposed to the outside; and a shaft projecting from the flat portion to the inside of the envelope and being connected to the current collector.

With this configuration, the external terminal is electrically connected to the current collector by inserting the shaft into the envelope so that a bus bar can be connected to the flat portion exposed to the outside.

The external terminal may comprise a plate-like member and a rod-like connecting member, the rod-like connecting member may be inserted into a through hole formed in the plate-like member, the plate-like member may have an exposed surface, and an end surface of the rod-like connecting member may constitute a part of the exposed surface of the plate-like member.

With this configuration, the through hole is formed at the plate-like member, the rod-like connecting portion is inserted into the through hole, and the end surface of the rod-like connecting portion simply constitutes a part of the exposed surface, thus readily forming the external terminal.

The rod-like connecting member may be a rivet having a flange and a shaft extending from the flange.

The flange of the rivet may be press-fitted into the through hole of the plate-like member so that the flange constitutes a part of the exposed surface.

The external terminal may comprise a plate-like member and a rod-like connecting member, one end of the rod-like connecting member may be contained in a recess formed at the inner surface on a side opposite to an exposed surface of the plate-like member, and the other end of the rod-like connecting member may project from the inner surface of the plate-like member.

With this configuration, the recess is formed in the plate-like member, and then, one end of the rod-like connecting portion is simply disposed in the recess, thus readily forming the external terminal. The boundary section between the plate-like member and the rod-like connecting portion is not formed on the surface of the plate-like member, thereby corrode from the surface side of the plate-like member does not enter from the boundary section to the inside.

The rod-like connecting member may be a rivet having a flange and a shaft extending from the flange.

Further, the plate-like member and the rod-like connecting member can be made of different materials.

Furthermore, the different materials may be copper and aluminum.

Despite materials which are difficult to weld each other such as copper and aluminum, the process becomes easy and a firmly fixed state can be achieved.

A portion of the rod-like connecting member in contact with the plate-like member may be formed into an uneven shape.

With this configuration, it becomes possible to increase the pressure welding area and the fixed strength. Moreover, it can prevent that the plate-like member or the rivet is rotated by such as vibration.

An expanding portion which expands toward the outside may be formed at a part of the envelope, and further, the flat portion of the external terminal is disposed on a side of an outer surface of the expanding portion.

With this configuration, in the case where a bus bar is welded to the flat portion of the external terminal, a predetermined distance can be secured between the welded portion and the inside of the storage element (such as the power generating element) so that heat generated during the welding is hardly transmitted to the inside of the storage element, thus preventing adverse influence (deformation or the like) caused by the heat.

The external terminal may be a negative external terminal.

DESCRIPTION OF THE PREFERRED EMBODIMENT

Hereinafter, an embodiment according to the present invention will be described with reference to the attached drawings. In the following description, the terms indicating specific directions or positions (including, for example, "above," "below," "side," and "end") are used, as required. Here, the use of the terms is directed to facilitate the understanding of the invention, and therefore, the meanings of the terms should not restrict the technical scope of the present invention. Moreover, the following description is merely an essential example, and therefore, should not intend to restrict the present invention and its application or usage.

Figure 1:
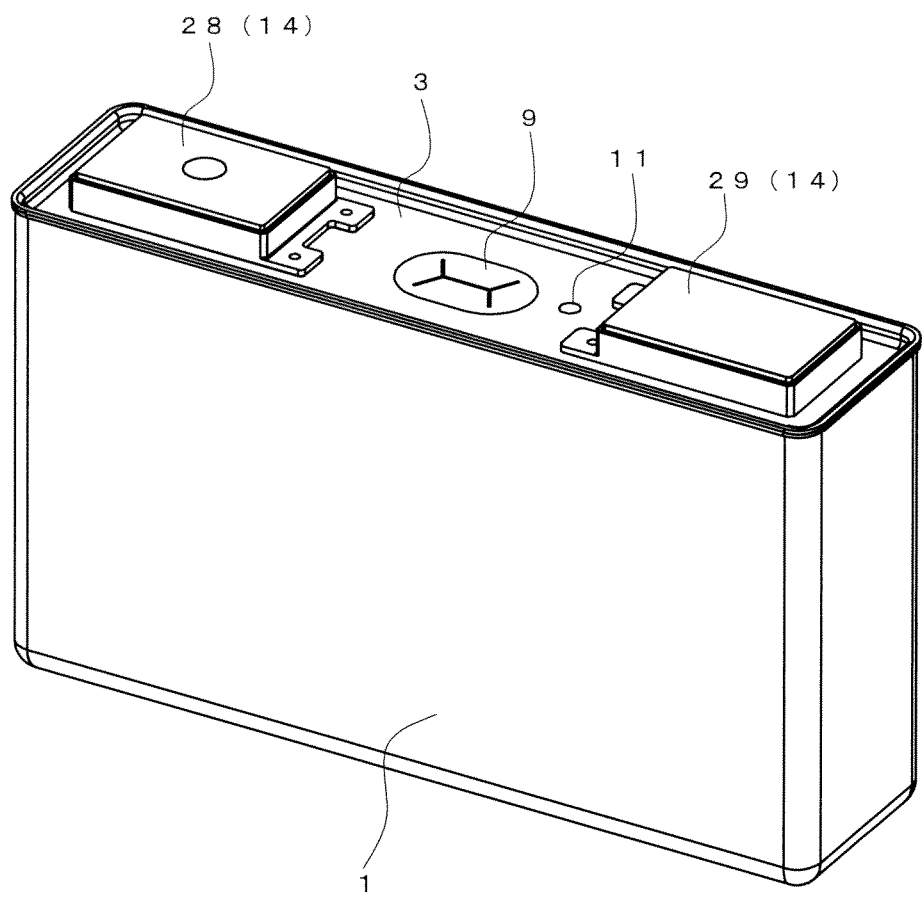
FIG. 1 is a perspective view of a battery in an embodiment according to the present invention.
Figure 2:
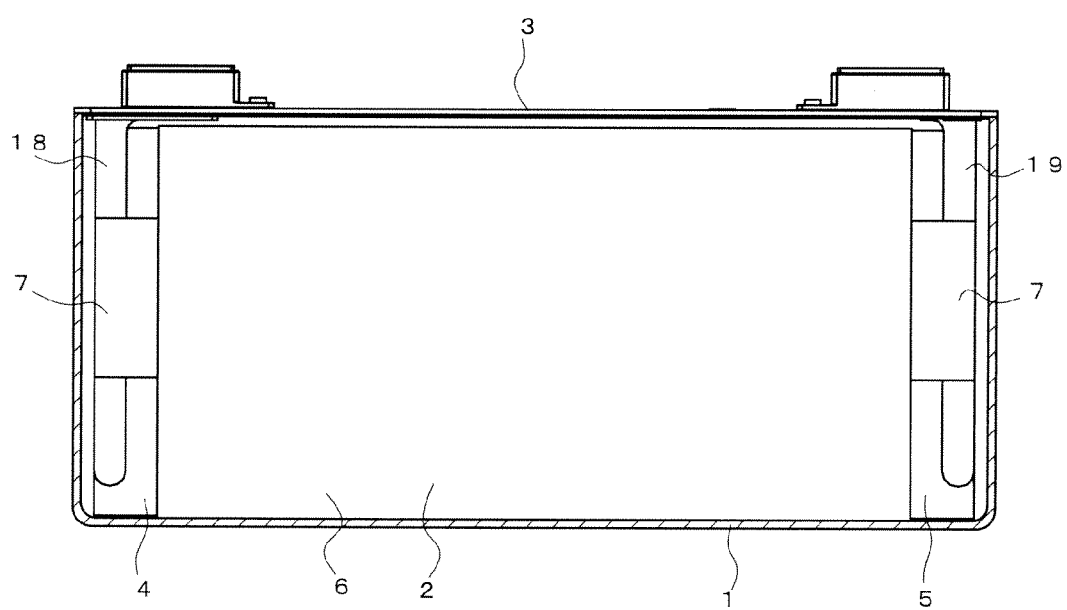
FIG. 2 is a front cross-sectional view of the battery in the embodiment according to the present invention.
Figure 3:
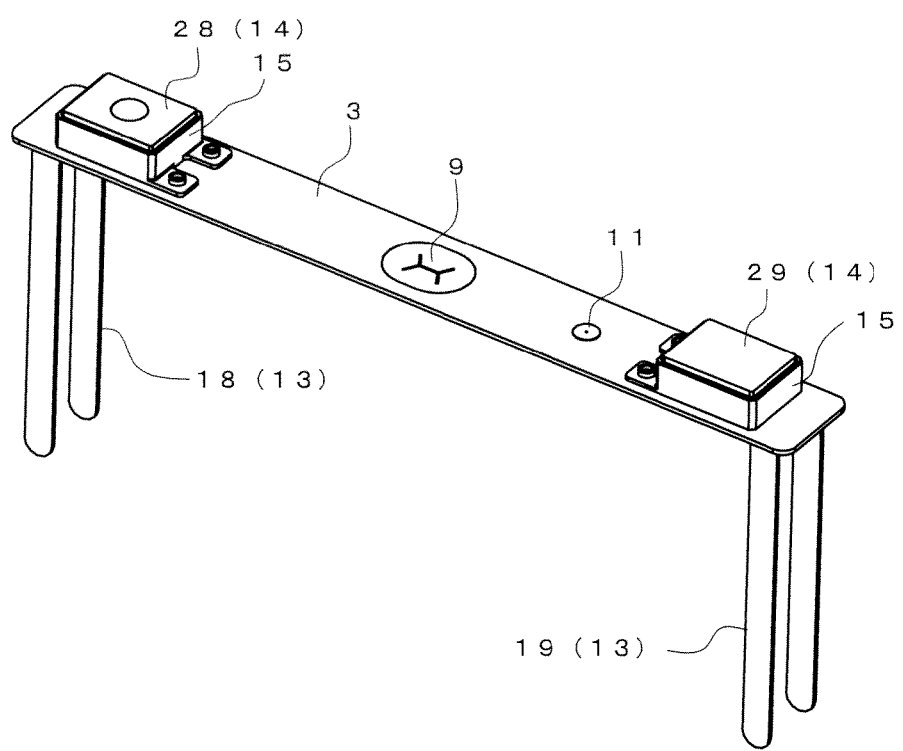
FIG. 3 is a perspective view of a cover shown in FIG. 1, as viewed from the top.
Figure 4:
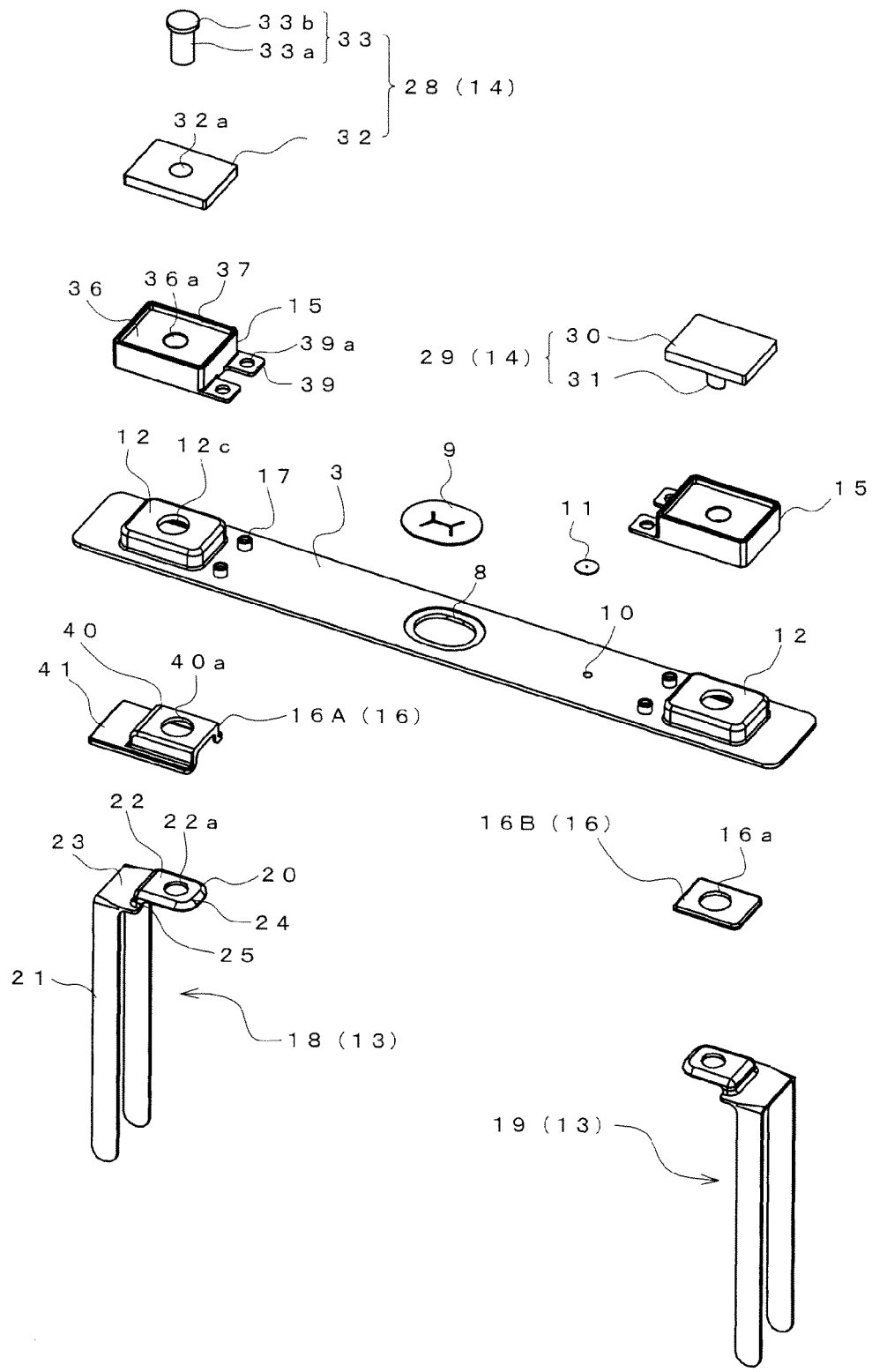
FIG. 4 is an exploded perspective view of FIG. 3.
Figure 5:
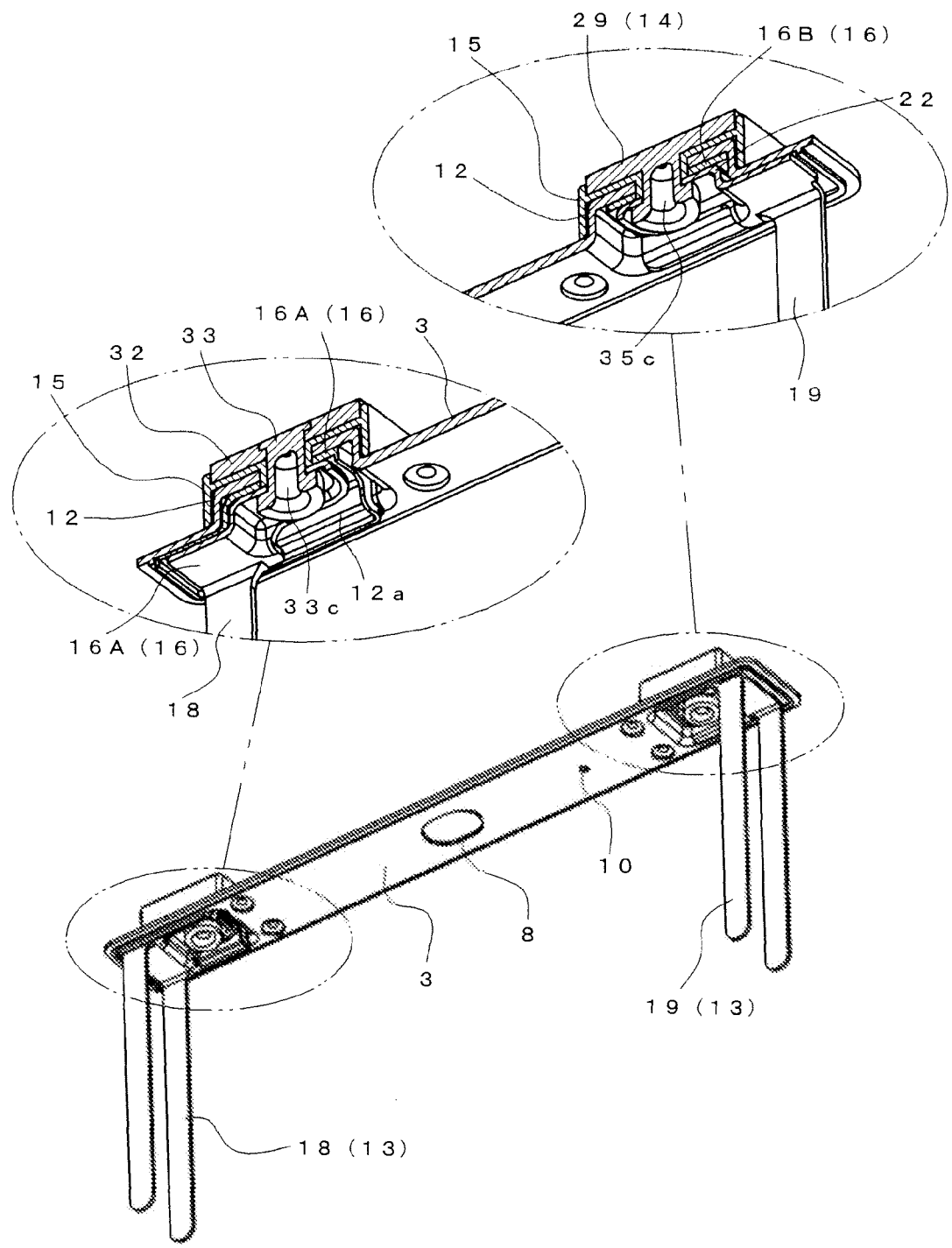
FIG. 5 is a perspective view of the cover shown in FIG. 1, as viewed from the bottom and partly enlarged cross-sectional views of the cover.
Figure 6:
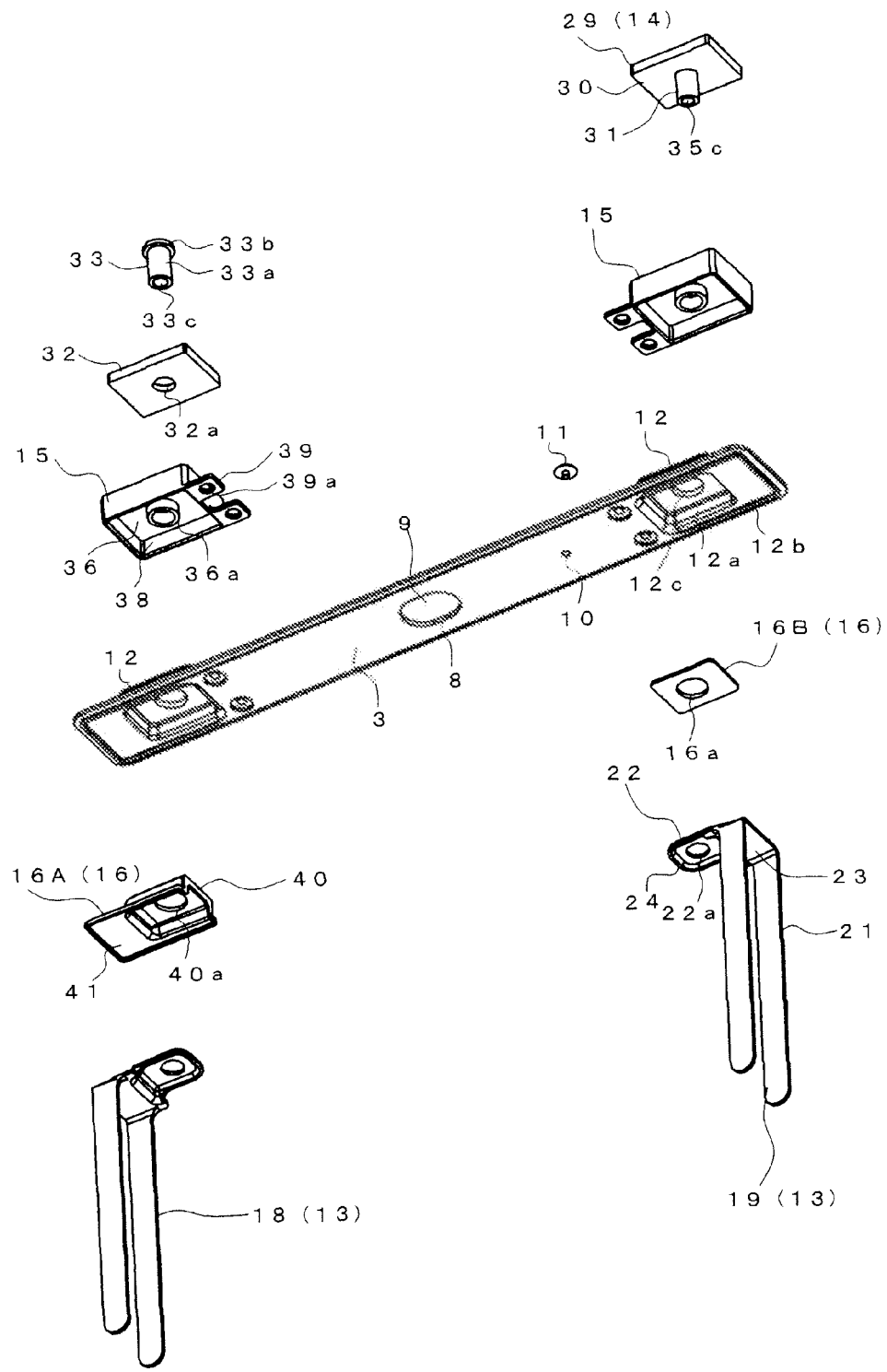
FIG. 6 is an exploded perspective view of the cover shown in FIG. 5.

FIG. 1 shows a nonaqueous electrolytic secondary battery as example of a storage element. The nonaqueous electrolytic secondary battery contains a power generating element 2 inside of a battery case 1, and is sealed with a cover 3, as shown in FIG. 2. Here, the battery case 1 and the cover 3 constitute an envelope member.

The battery case 1 is formed into a rectangular parallelepiped shape opened at the upper surface thereof, and is made of aluminum or an aluminum alloy, etc.

The power generating element 2 includes a negative electrode 4 formed of a copper foil, a positive electrode 5 formed of an aluminum foil, and a separator 6 made of a porous resin film and interposed between the negative electrode 4 and the positive electrode 5, like the prior art, although its details will not be shown. All of these members are formed into a belt shape, and the negative electrode 4 and the positive electrode 5 are flat wound in such a manner as to be contained inside of the battery case 1 in the state in which the negative electrode 4 and the positive electrode 5 are displaced with respect to the separator 6 oppositely in a widthwise direction. As described later, a negative electrode current collector 18 is connected to the negative electrode 4 via a clip 7 whereas a positive electrode current collector 19 is connected to the positive electrode 5 via another clip 7.

As shown in FIGS. 3 to 6, the cover 3 is made of a metallic elongated plate having a rectangular shape, as viewed on plane. A substantially elliptic opening 8 having a step from the upside is formed at the center of the cover 3. A safe valve 9 made of rubber is fitted to the opening 8. A substantially H-shaped thin portion is formed at the safe valve 9. The thin portion is torn in the case of an abnormal increase in inner pressure, so that pressure can be decreased.

A small-diameter liquid injection hole 10 is formed at one end of the cover 3, and it is designed to be closed via a plug 11 after liquid injection.

An engagement receiving portion 12, which is formed into a substantially rectangular shape, as viewed on plane, and is formed at the lower surface at both ends of the cover 3 so as to expand upward. In the engagement receiving portion 12, a shallow guide recess 12b is formed around an engagement recess 12a at the lower surface except one side. Moreover, a through hole 12c is formed at the center of a ceiling constituting the engagement recess 12a. An external terminal 14 and a current collector 13 are adapted to fit to the engagement recess 12 and the guide recess 12b via an upper gasket 15 and a lower gasket 16, respectively.

Lock projections 17 projecting upward from two portions in the widthwise direction are formed in the vicinity of the inside of each of the engagement receiving portion 12 in the cover 3. Each of the lock projections 17 is formed into a bottomed cylindrical shape at the same time when the cover 3 is pressed. The upper gasket 15, described later, is locked to the lock projections 17, to be thus positioned in a rotational direction.

The current collectors 13 include the negative current collector 18 made of copper and the positive current collector 19 made of aluminum. In the current collector 13, a connection receiver 20 and legs 21 extending from both sides of the connection receiver 20 are formed by pressing a metallic elongated plate material. The connection receiver 20 is constituted of a fitting portion 22 to be fitted to the recess formed at the cover 3 and a mount portion 23 continuous to the fitting portion 22. The fitting portion 22 is formed into a planar shape, and has a through hole 22a at the center thereof and a guide edge 24 extending in a vertical direction at the circumferential edge except one side continuous to the mount portion 23. The side of the mount portion 23 functions as a continuous portion 25 extending further beyond the guide edge 24, and thus, reaches the mount portion 23. The guide edge 24 and the continuous portion 25 satisfactorily enhance the rigidity of the connection receiver 20 in the current collector 13.

The legs 21 extend in the vertical direction from both side edges of the mount portion 23 along both side surfaces of the power generating element 2. The legs 21 are connected to the positive electrode 5 or the negative electrode 4 in the power generating element 2 via the clip 7. Positional deviation can be prevented since the clip 7 is held between the inner surfaces, opposite to each other, of the battery case 1.

The external terminals 14 include a negative electrode external terminal 28 and a positive electrode external terminal 29. The external terminal 14 includes a flat plate 30 and a shaft 31 extending downward from the center at a lower surface thereof. To a surface (an exposed surface) of the flat plate 30 is welded a bus bar, not shown.

Figure 7A:
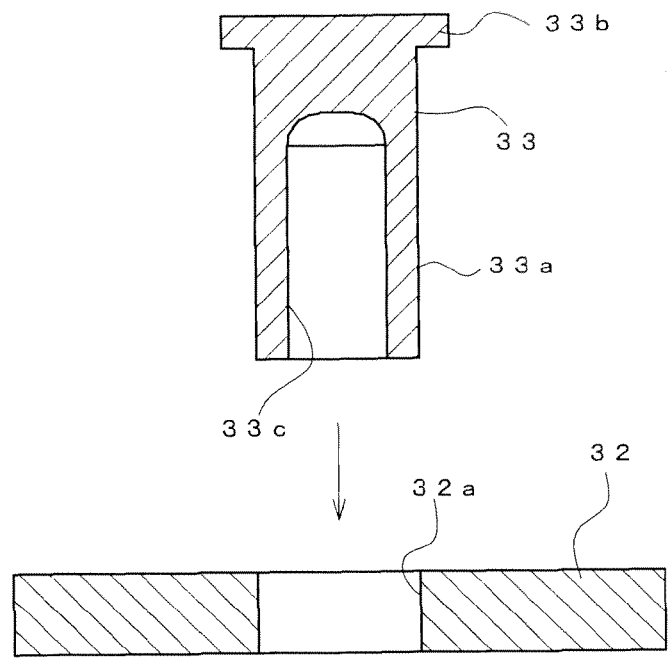
FIGS. 7A and 7B are cross-sectional views illustrating fabrication processes for a negative external terminal shown in FIG. 4.
Figure 7B:
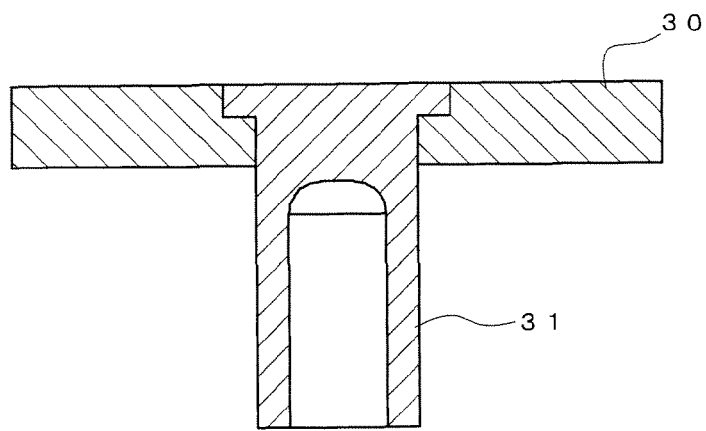

As shown in FIG. 7, the negative electrode external terminal 28 is formed of an aluminum plate 32 having a rectangular shape, as viewed on plane, and a copper rivet 33. That is to say, a shaft 33a of the rivet 33 is inserted into a through hole 32a formed at the center of the aluminum plate 32, and then, a flange 33b is press-fitted into the through hole 32a by pressing. The dimension of an inner diameter of the through hole 32a formed at the plate 32 is slightly greater than that of an outer diameter of the shaft 33a of the rivet 33 and sufficiently smaller than that of an outer diameter of the flange 33b. As a consequence, the flange 33b presses and enlarges the through hole 32a by press-fitting, to be thus turned to a press-fitted state, and further, the press-enlarged portion is brought into press-contact with the shaft 33a, to be thus integrated therewith. Moreover, a circular recess 33c is formed at the center of the tip surface of the shaft 33a in the rivet 33. The shaft 33a is inserted into the respective through holes of the upper gasket 15, the engagement receiving portion 12 of the cover 3, the lower gasket 16, and the negative electrode current collector 18 in a later-described manner, and then, the recess 33c is pressed and enlarged while holding the members therein, followed by securely caulking.

On the other hand, the positive external terminal 29 is made of aluminum as a whole, and further, the flat portion 30 and the shaft 31 are formed integrally with each other.

The upper gasket 15 is made of a synthetic resin, wherein the inner space of a frame having a rectangular shape, as viewed on plane, is divided into an upper terminal holding recess 37 and a lower containing recess 38 via a partition wall 36. Tongue pieces 39 extend sideways from one of sides constituting a lower opening edge. A cylindrical portion 36a extending downward from the ceiling is formed at the center of the partition wall 36. The cylindrical portion 36a is fitted to a through hole 40a formed at the lower gasket 16 through the through hole 12c formed at the engagement receiving portion 12. A lock hole 39a is formed in each of the two tongue pieces 39, and thus, is fitted to the lock projection 17 formed in the cover 3. The upper gasket 15 conforms to the engagement receiving portion 12 in the cover 3 formed into the rectangular shape, as viewed on plane, and therefore, it can be prevented from being positionally deviated in the rotational direction only by its placement on the engagement receiving portion 12. In addition, the insertion of the lock projection 17 into the lock hole 39a can securely prevent any positional deviation in the rotational direction.

The lower gasket 16 is made of a plate having a rectangular shape, as viewed on plane, and further, is made of rubber having a through hole 16a at the center thereof. The lower gaskets 16 on the negative electrode side and the positive electrode side are slightly different from each other in shape.

A lower gasket 16A on the negative electrode side includes an expanded portion 40 to be contained inside of the engagement recess 12a formed at the engagement receiving portion 12 in the cover 3 and a flat portion 41 continuous to the expanded portion 40. The expanded portion 40 is formed into a shape in conformity with the inner surface of the engagement recess 12a of the engagement receiving portion 12 except one side thereof, and further, the through hole 40a is formed at the center thereof. The flat portion 41 is fitted to the guide recess 12b of the engagement receiving portion 12. The lower gasket 16A on the negative electrode side is contained from below inside of the engagement recess 12a constituting the engagement receiving portion 12 in the cover 3, and thus, is held between the cover 3 and the negative electrode external terminal 28. In this held state, the lower gasket 16A aims at the insulation between the negative electrode external terminal 28 and the cover 3, and further, seals the through hole 12c formed in the engagement receiving portion 12 in the cover 3 together with the upper gasket 15.

On the other hand, a lower gasket 16B on the positive electrode side is formed into a flat shape, and further, has a through hole 16a at the center thereof, and thus, is contained inside of the engagement recess 12a constituting the engagement receiving portion 12. The lower gasket 16B on the positive electrode side seals the through hole 12c formed in the engagement receiving portion 12 in the cover 3 together with the upper gasket 15.

With the battery having the above-described configuration, the exposed surface of the external terminal 14 is configured by a flat surface, so that a bus bar (not shown) can be readily connected. When the shaft 31 of the external terminal 14 is inserted into the respective through holes of the upper gasket 15, the cover 3, the lower gasket 16, and the current collector 13, followed by securely caulking, these members can be integrated with one another. Further, the external terminal 14 can be readily fabricated only by press-fitting the rivet 33 to the plate-like member 32. Thus, the configuration of the external terminal 14 is greatly simplified and the fabrication thereof is simple and can be inexpensively carried out.

Incidentally, the present invention is not limited to the configuration described in the embodiment, but it may be variously modified.

Figure 8A:
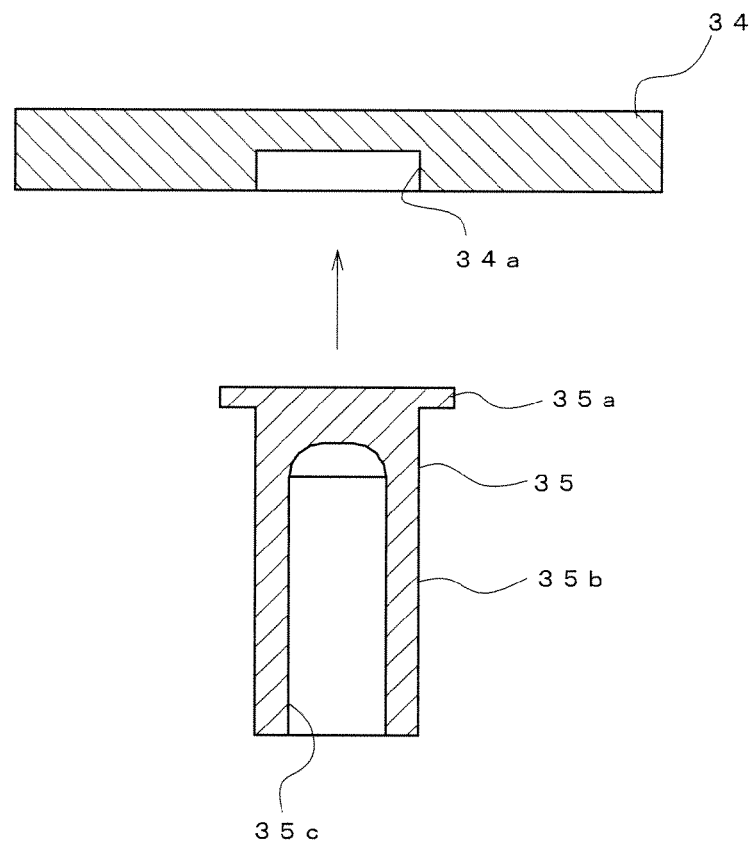
FIGS. 8A and 8B are cross-sectional views illustrating other fabrication processes for the negative electrode terminal shown in FIG. 4.
Figure 8B:
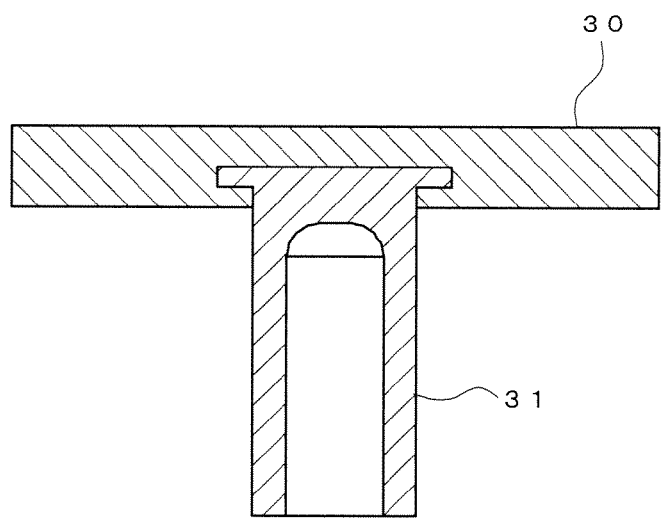

For example, a flange 35a of a copper rivet 35 is press-fitted into a recess 34a, which is formed into a circular shape, as viewed on plane, at the center of the lower surface of a plate-like member 34, which is made of aluminum and formed into a rectangular shape, as viewed on plane, thus achieving the negative external terminal 28, as illustrated in FIG. 8. In this case, the inner diameter of the recess 34a is slightly greater than the outer diameter of a shaft 35b of the rivet 35 and sufficiently smaller than the outer diameter of the flange 35a. In this manner, the flange 35a widens the recess 34a under pressure by press-fitting, and thereafter, reaches the bottom of the recess 34a, so that the inner circumferential surface of the recess 34a is expanded around the shaft 35b, thus providing a press-contact state. Consequently, a firmly fixed state can be achieved. Moreover, a circular recess 35c is formed at the center of the tip surface of the shaft 35b of the rivet 35. The shaft 35b is inserted into the respective through holes of the upper gasket 15, the engagement receiving portion 12 of the cover 3, the lower gasket 16, and the positive current collector 19, as described later, and then, the recess 35c is widened under pressure to be thus caulked in such a manner as to hold these members therein.

In the negative external terminal 28 (See FIG. 8) which is formed as described above does not have a boundary section between the rivet and the external terminal on the surface of the plate-like portion 30 compared with the configuration shown in FIG. 7. Therefore, the following effect can be obtained. The corrode from the surface side of the plate-like portion 30 does not enter from the boundary section to the inside portion like the configuration shown in FIG. 7. Even if the corrosive gas occurs from the inside portion, the gas does not transude to the plate-like portion 30, thereby the plate-like portion 30 is not corroded. Since the shaft 35b is not exposed to air, condensation does not occur on the surface of it. Thus, there is no possibility of the electric corrosion of the shaft. Even if the coat of the plate-like portion is revealed by being scratched on the surface of it, the plate-like portion 34 made of aluminum and the rivet 35 made of copper does not contact with each other at the revealed portion, thereby there is no possibility of electric corrosion and corrode. Although it is difficult to weld between the plate-like portion 34 made of aluminum and the rivet 35 made of copper, the process becomes easy and also a firmly fixed state can be achieved by adopting the configuration integrated with each other by the above mentioned press fitting.

Although the circular flange 33b or 35a is generally used in the rivet 33 or 35 to be press-fitted into the through hole 32a of the plate-like member 32 or the recess 34a of the plate-like member 34 in the negative external terminal 28, its outer peripheral surface may be formed into an uneven shape such as a sawtooth or waveform. With this configuration, it is possible to increase a press-contact area between the flange and the inner circumferential surface of the through hole 32a or the recess 34a, to which the members are press-fitted, and therefore, fixing strength can be increased.

Additionally, the external terminal 14 constituted of the plate-like member 34 and the rivet 35 is not limited to the negative external terminal 28. Both of the plate-like member 34 and the rivet 35 may be made of aluminum, thus forming the positive external terminal 29 (in this case, the rivet 35 may be made of aluminum having greater rigidity than that of the plate-like member 34 even in the case of the same aluminum material).

In place of the rivet 35, a member having a gradually greater outer diameter from one end toward the other end may be used as long as it is provided with the flange 33b or 35a and the shaft 33a or 35b.

Thus, the structure of the external terminal 14 for the battery according to the present invention may be applied to various batteries such as a lithium ion battery and a lead storage battery.

According to an embodiment of the present invention, the outside terminal is constituted of the flat partition and the shaft, simplifying the structure of the storage element, so as to readily fabricate the storage element at a reduced cost.

What is claimed is:

1. A storage element, comprising:
   an envelope;
   an external terminal including an exposed surface which is exposed to the outside of the envelope;
   a current collector which is contained inside of the envelope and is connected to the external terminal; and a power generating element which is contained inside of the envelope and is connected to the current collector, wherein the external terminal includes:
a flat portion exposed to an outside of the envelope and being configured such that a member for establishing electrical connection is connected to the flat portion; and
a shaft projecting from the flat portion to only an inside of the envelope and being connected to the current collector,
wherein the flat portion is aligned with an axis of the shaft, and
wherein the flat portion and the shaft comprise different materials.

2. A storage element according to claim 1, wherein the external terminal comprises a plate-like member and a rod-like connecting member,
wherein the rod-like connecting member is inserted into a through hole formed in the plate-like member, the plate-like member includes an exposed surface, and
wherein an end surface of the rod-like connecting member constitutes a part of the exposed surface of the plate-like member.

3. A storage element according to claim 2, wherein the rod-like connecting member comprises a rivet comprising a flange and a shaft extending from the flange.

4. A storage element according to claim 3, wherein the flange of the rivet is press-fitted into the through hole of the plate-like member so that the flange constitutes a part of the exposed surface of the plate-like member.

5. A storage element according to according to claim 2, wherein a portion of the rod-like connecting member in contact with the plate-like member is formed into an uneven shape.

6. A storage element according to claim 2, wherein the envelope comprises a battery case and a cover,
wherein an engagement receiving portion which expands upward is formed at a lower surface of the cover, and
wherein the flat portion of the external terminal is disposed on a side of an outer surface of the engagement receiving portion.

7. A storage element according to claim 2, wherein the external terminal comprises a negative external terminal.

8. A storage element according to claim 1, wherein the flat portion comprises a plate-like member and the shaft comprises a rod-like connecting member,
wherein one end of the rod-like connecting member is contained in a recess formed at the inner surface on a side opposite to an exposed surface of the plate-like member, and
wherein an other end of the rod-like connecting member projects from the inner surface of the plate-like member.

9. A storage element according to claim 8, wherein the rod-like connecting member comprises a rivet comprising a flange and a shaft extending from the flange.

10. A storage element according to claim 9, wherein the flange of the rivet is press-fitted into the recess of the plate-like member so that the shaft projects from the inner surface of the plate-like member.

11. A storage element according to claim 10, wherein the plate-like member and the rod-like connecting member comprise different materials.

12. A storage element according to claim 11, wherein the different materials comprise copper and aluminum.

13. A storage element according to according to claim 8, wherein a portion of the rod-like connecting member in contact with the plate-like member is formed into an uneven shape.

14. A storage element according to claim 8, wherein an expanding portion which expands toward the outside is formed at a part of the envelope, and
wherein the flat portion of the external terminal is disposed on a side of an outer surface of the expanding portion.

15. A storage element according to claim 8, wherein the external terminal comprises a negative external terminal.

16. A storage element according to claim 1, wherein the flat portion comprises a through hole for inserting the member for establishing electrical connection, a central axis of the through hole being coincided with the axis of shaft.

17. A storage element according to claim 1, wherein the member for establishing electrical connection comprises a bus bar.

18. A storage element according to claim 17, wherein the bus bar is welded to the flat portion of the external terminal.

* * * * *